United States Patent

[11] 3,596,327

[72] Inventor: Jacques Andre Germain Dubard, Colombes, France
[21] Appl. No.: 792,687
[22] Filed: Jan. 21, 1969
[45] Patented: Aug. 3, 1971
[73] Assignee: Societe Des Etablissements Andouart, Bezons, France
[32] Priority: Jan. 26, 1968
[33] France
[31] 137,544

[54] EXTRUSION MACHINES COMPRISING A VERTICAL BARREL OR CASE
8 Claims, 2 Drawing Figs.

[52] U.S. Cl. .................................... 18/12 SV, 18/12 SS
[51] Int. Cl. ..................................... B29f 3/02
[50] Field of Search .......................... 18/12 SV, 12 SR, 12 M, 12 P, 12 SH, 12 SI, 12 SN, 12 SS

[56] References Cited
UNITED STATES PATENTS
1,017,286  2/1912  Du Pont ............... 18/12
3,329,101  7/1967  Urschel ............... 18/12

FOREIGN PATENTS
920,067  11/1954  Germany ............. 18/12 SV
1,380,464  10/1964  France ............... 18/12 SI Primary Examiner—J. Spencer Overholser
Assistant Examiner—R. L. Spicer, Jr.
Attorney—Young & Thompson ABSTRACT: An extruding machine having a vertical extrusion screw is provided with a driving pulley keyed to the extrusion screw and housed between two stationary plates, the upper plate having a base for the feed hopper or chute and the lower plate being joined to the upper end part of the case for the extrusion screw. The driving pulley carries, on the hopper side, a feed screw for promoting the feed of material to the extrusion screw below.

PATENTED AUG 3 1971 3,596,327

INVENTOR.
JACQUES ANDRE GERMAIN DUBARD
By Young & Thompson
ATTYS.

EXTRUSION MACHINES COMPRISING A VERTICAL BARREL OR CASE

BACKGROUND OF THE INVENTION

1. Field of the Invention

The present invention relates to improvements in extrusion machines comprising a vertical barrel or case.

2. Description of the Prior Art

In known machines, the feed of plastic material in the form of powder or of granulates is provided by a hopper or lateral feed spout or chute arranged to supply the product radially to the extrusion screw and at the upper portion of the screw. The feed spout or chute may have a sloping configuration to promote the dropping of the products it contains.

However, with machines of this type, which are normally devised and constructed according to the principle of the conventional horizontal extruders and merely turned through 90°, great difficulties are encountered in assuring the supply of the product, because the product does not slide easily on the sides of the feed hopper. The same applies in respect of the sides of the chute.

The present invention has the object of providing an extruding machine which is of simple construction and which does not suffer from the above-mentioned disadvantage.

SUMMARY

According to the invention an extrusion machine comprising a vertical extrusion barrel or case, within which a revolving extrusion screw is supplied with plastic material from a hopper or chute arranged as an axial extension of said screw, is characterized in that the supply to the extrusion screw is provided through the hub of a driving wheel or pulley held in fixed relation with said screw, the said wheel or pulley being located in abutments between two stationary plates, the lower plate being formed as the upper terminal part of the extrusion case and the upper plate being rigidly joined to the lower plate and carrying the stationary feed hopper, and in that the said hub of the driving wheel or pulley is arranged to carry, on the hopper side, a feed screw promoting the feed to the extrusion screw as such.

Preferably the hub of the driving wheel or pulley comprises three ducting passages separated by webs. It is also preferred that the ducting passages open into a chamber provided in the lower stationary plate, which chamber surrounds the extrusion screw.

This arrangement offers many advantages. In the first place, given that the hopper or chute has its axis vertical, the sides of the same are very steep, and thereby the plastic material in the form of powder or of granulates is no longer held back therein but descends by gravity to the said feed screw from which it is transferred mechanically into the passages of the hub, then into the chamber following the same. The supply to the extrusion screw is thus certain and constant, thereby assuring a much more flexible operation.

In the second place, this arrangement is of very simple structure and results in a compact assembly.

DESCRIPTION OF THE PREFERRED EMBODIMENT

Figure 1:
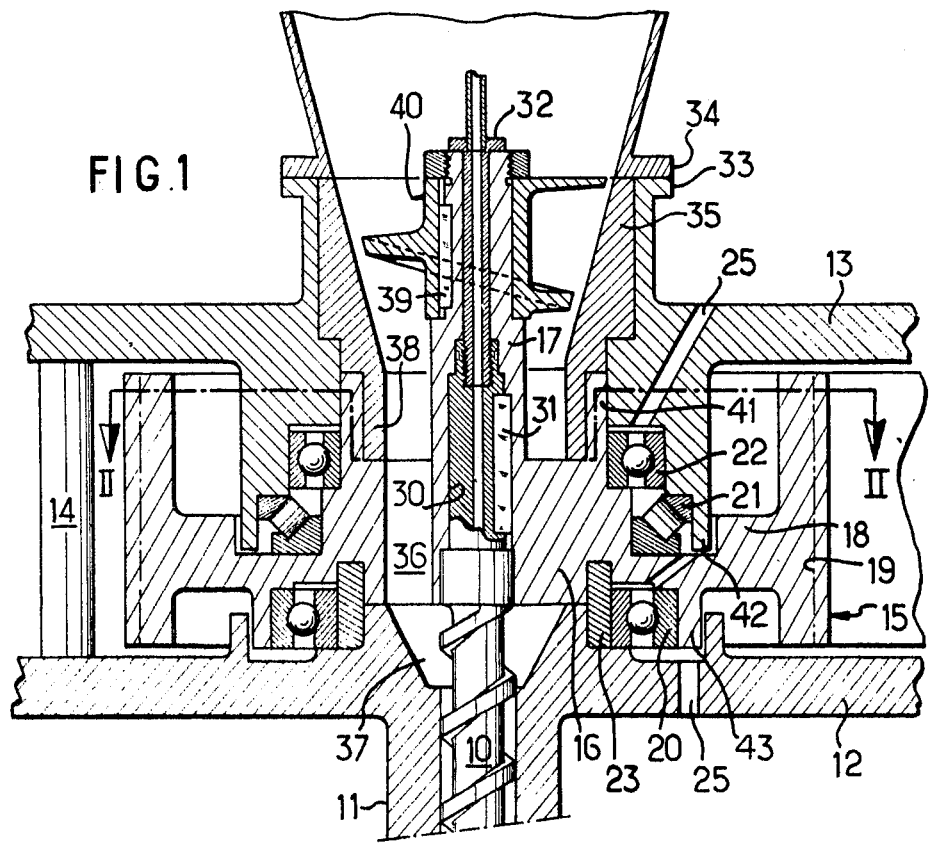
FIG. 1 is, by way of example, a vertical cross-sectional elevation of an extruding machine according to the invention.

With reference to the drawings, there is shown a part of the upper portion of an extruding machine for plastic material, the machine having an extrusion screw 10 for rotation about a vertical axis in a barrel or case 11. The case 11 terminates in a plate 12 joined to a second plate 13 in spaced-apart relation by means of bracing posts 14.

Between the two plates 12, 13, is situated a driving wheel or pulley 15 for rotation of the extrusion screw 10 through a transmission system receiving its drive from a motor device (not shown).

The driving pulley 15 comprises a hub 16 possessing an upwardly extending axial extension 17, a web 18 and a rim 19 which rim has, advantageously, a grooved peripheral surface.

The driving pulley 15 is secured between the two plates 12, 13 by means of ball and roller bearing assemblies 20, 21 and 22 mounted between flanges or lips provided on the hub 16 and the plates 12, 13 to allow for rotation of the hub about its vertical axis. Sealing rings 23 are provided to prevent the escape of plastic material.

The pulley 15 thus installed between the two plates is thereby guided axially as well as radially, and greasing orifices 25 are provided in each of the plates 12, 13 to allow for the lubrication of the ball and roller bearing assemblies 20, 21 and 22.

At its upper end, the extrusion screw 10 engages in a central bore 30, provided partially in the hub 16 and partially in the extension 17, and is held in fixed relation with the pulley 15 by means of a key 31. The extrusion screw 10 and the pulley 15 are also coupled together axially be means of a fitting screw 32.

Figure 2:
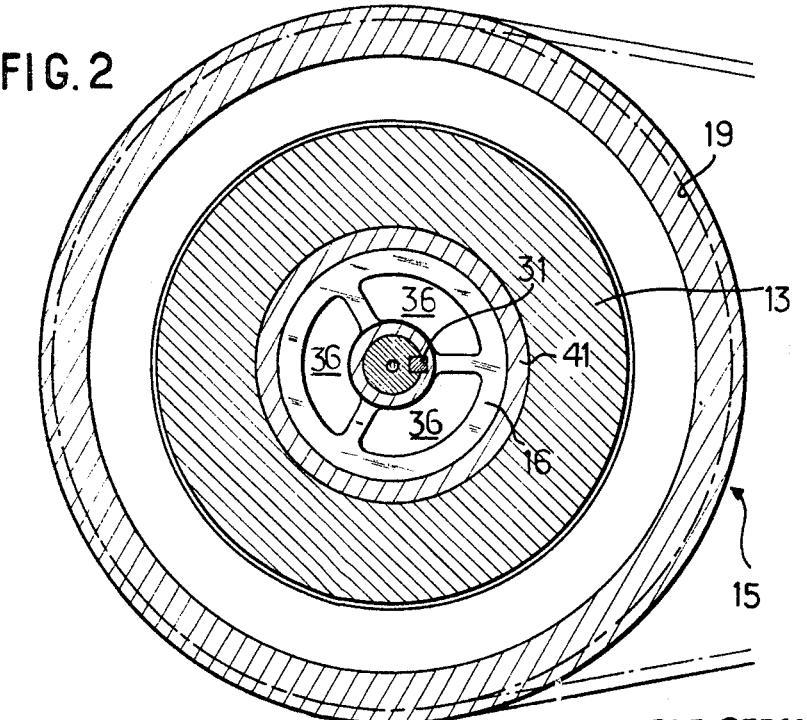
FIG. 2 is a section along the line II–II in FIG. 1.

The second or upper plate 13 has a flange 33 on which is connected the lower part of a hopper or chute 34. Moreover, the second plate 13 receives an internally frustoconical sleeve or lining 35 which is open to the hopper, at one side, and, at the other side, to the central portion of the hub 16 of the pulley 15, which hub is equipped with passages 36 more clearly apparent from FIG. 2 These passages 36 are, in turn, open to a chamber 37 provided in the lower plate, which chamber surrounds the extrusion screw 10.

It will be seen from FIG. 1 that the sleeve 35 has a lower terminal ring 38 arranged to cooperate by means of its outer surface with the inner side of a flange 41 of the hub, whereby sealing is achieved between the plate 13 and the hub 16 of the driving pulley 15. At the lower end of the hub 16, sealing is achieved by means of a second flange 42 which is inset and engages in a groove in the pulley and by a third flange 43 that engages in a groove in plate 12.

Within the sleeve 35, the extension 17 of the hub 16 carries a feed screw 40 of frustoconical appearance which is fixed to the extension 17 by a key 39, the screw 40 and the internal surface of the sleeve 35 having analogous angles of conicity. With this simple arrangement, the supply to the extrusion screw 10 is assured in satisfactory conditions of uniformity, particularly in view of the fact that the plastic material contained in the hopper 34 drops by gravity direct on to the feed screw 40 which ensures the transfer of the same to the extrusion screw 10 through the ducting passages 36 and the chamber 37.

I claim:

1. An extruding machine comprising a vertical extrusion barrel or case, within which a revolving extrusion screw is supplied with plastic material from a superposed hopper or chute arranged as an axial extension of said screw, characterized in that the supply to the extrusion screw is provided through the hub of a driving wheel or pulley held in fixed relation with said screw, the said wheel or pulley being located in abutments between two stationary plates, the lower plate being formed as the upper terminal part of the extrusion case and the upper plate being rigidly joined to the lower plate and carrying the stationary feed hopper, and in that the said hub of the driving wheel or pulley carries, on the hopper side opposite the extrusion screw, a feed screw promoting the feed to the extrusion screw.

2. An extruding machine according to claim 1, wherein the drive means is a pulley mounted for rotation between said stationary plates by means of bearing assemblies and comprises a hub which is provided with ducting passages for feeding of the plastic material from the hopper to the extrusion screw, and also a central bore forming a bearing for a corresponding portion of the extrusion screw.

3. An extruding machine according to claim 1, wherein the feed screw is disposed on a portion of the hub and extends into a sleeve forming an extension of the hopper, the lower terminal portion of this sleeve being received in a corresponding recess in the hub of the drive means.

4. An extruding machine according to claim 3, wherein the periphery of the feed screw and the internal surface of the sleeve disposed thereabout are of frustoconical shape whose diameters increase in the upward direction along their common axis.

5. An extruding machine according to claim 1, wherein the hub of the drive means comprising a plurality of ducting passages separated by webs.

6. An extruding machine according to claim 5, wherein the ducting passages open into a chamber provided in the lower stationary plate, said chamber surrounding the extrusion screw.

7. An extruding machine with a vertical extrusion case comprising: an extrusion screw disposed in said case, a hopper arranged coaxially above the extrusion screw for feeding plastic material to the feeding screw, drive means including a hub coupled for rotation with said extrusion screw, said drive means being fitted between two stationary plates, the lower plate being formed as the upper end portion of said extrusion case and the upper plate being fixed to the lower plate and carrying said hopper, a feed screw extending in the direction of the hopper and being adapted to be driven by said drive means for feeding plastic material to the extrusion screw.

8. An extruding machine of the vertical extrusion type comprising: a hopper for plastic material, a vertical feed screw for feeding plastic material from the hopper to a vertical extrusion screw, said extrusion screw being arranged coaxial with the feed screw and axially spaced therebeneath, and a drive means being coupled to both the feed screw and the extrusion screw for rotating them about their common axis, said drive means being arranged between the feed screw and the extrusion screw along their common axis.